United States Patent
Koshelev et al.

(10) Patent No.: US 11,555,961 B1
(45) Date of Patent: Jan. 17, 2023

(54) DISPLAY DEVICE WITH WAVEGUIDE-BASED TALBOT ILLUMINATOR

(71) Applicant: Facebook Technologies, LLC, Menlo Park, CA (US)

(72) Inventors: Alexander Koshelev, Redmond, WA (US); Giuseppe Calafiore, Redmond, WA (US); Ying Geng, Bellevue, WA (US); Fenglin Peng, Redmond, WA (US); Jacques Gollier, Sammamish, WA (US)

(73) Assignee: Meta Platforms Technologies LLC, Menlo Park, CA (US)

( * ) Notice: Subject to any disclaimer, the term of this patent is extended or adjusted under 35 U.S.C. 154(b) by 0 days.

(21) Appl. No.: 17/525,211

(22) Filed: Nov. 12, 2021

Related U.S. Application Data

(60) Provisional application No. 63/222,224, filed on Jul. 15, 2021.

(51) Int. Cl.
*F21V 8/00* (2006.01)
*G02B 6/124* (2006.01)
(Continued)

(52) U.S. Cl.
CPC ......... *G02B 6/124* (2013.01); *G02B 6/12004* (2013.01); *G02B 6/125* (2013.01);
(Continued)

(58) Field of Classification Search
CPC ........ G02B 5/18; G02B 5/181; G02B 5/1814; G02B 5/1857; G02B 6/0036;
(Continued)

(56) References Cited

U.S. PATENT DOCUMENTS

| 5,911,018 A | 6/1999 | Bischel et al. |
| 6,201,913 B1 | 3/2001 | Yi et al. |

(Continued)

FOREIGN PATENT DOCUMENTS

| CN | 106405450 A | 2/2017 |
| EP | 3819688 A1 | 5/2021 |

(Continued)

OTHER PUBLICATIONS

Huyun Teng, Liren Liu, Jifeng Zu, Zhu Luan, and De'an Liu, "Uniform theory of the Talbot effect with partially coherent light illumination," J. Opt. Soc. Am. A 20, 1747-1754 (2003) (Year: 2003).*

(Continued)

*Primary Examiner* — Keith G. Delahoussaye
(74) *Attorney, Agent, or Firm* — Pequignot + Myers; Matthew A. Pequignot

(57) ABSTRACT

A waveguide illuminator for illuminating a display panel includes an input waveguide, a waveguide splitter coupled to the input waveguide, and a waveguide array coupled to the waveguide splitter. The waveguide array includes an array of out-couplers out-coupling portions of the split light beam to form an array of out-coupled beam portions for illuminating a display panel. The out-coupled beam portions undergo optical interference and form a Talbot pattern of illumination correlated with pixel array of the display panel, enabling an optical throughput increase by centering individual Talbot peaks on the display panel pixels.

20 Claims, 11 Drawing Sheets

(51) Int. Cl.
*G02B 6/125* (2006.01)
*G02B 6/12* (2006.01)
*G02B 27/09* (2006.01)
*G02B 27/10* (2006.01)
*G02B 6/28* (2006.01)
*G02B 27/01* (2006.01)

(52) U.S. Cl.
CPC ..... *G02B 6/12007* (2013.01); *G02B 27/0944* (2013.01); *G02B 27/0994* (2013.01); *G02B 27/106* (2013.01); *G02B 6/2804* (2013.01); *G02B 27/017* (2013.01)

(58) Field of Classification Search
CPC .......... G02B 6/0061; G02B 6/24; G02B 6/34; G02B 2006/12107; G02B 27/0944; G02B 27/4205; G02B 27/4272; G02B 27/4233; G02F 1/133504
USPC .......................................................... 385/10
See application file for complete search history.

(56) References Cited

U.S. PATENT DOCUMENTS

| | | | |
|---|---|---|---|
| 7,468,838 | B2 | 12/2008 | Cha et al. |
| 10,613,410 | B2 | 4/2020 | Hosseini et al. |
| 10,684,404 | B2 | 6/2020 | Fattal |
| 2005/0089277 | A1 | 4/2005 | Ishida |
| 2011/0274438 | A1 | 11/2011 | Fiorentino et al. |
| 2013/0155477 | A1 | 6/2013 | Yankov et al. |
| 2014/0314374 | A1 | 10/2014 | Fattal et al. |
| 2017/0090096 | A1 | 3/2017 | Fattal |
| 2017/0139110 | A1 | 5/2017 | Woodgate et al. |
| 2017/0299793 | A1 | 10/2017 | Fattal |
| 2018/0107091 | A1 | 4/2018 | Hosseini et al. |
| 2018/0113419 | A1 | 4/2018 | Stafford |
| 2018/0152680 | A1 | 5/2018 | Zimmerman et al. |
| 2019/0155105 | A1* | 5/2019 | Aieta .................... G02B 30/33 |
| 2020/0271850 | A1 | 8/2020 | Vora et al. |
| 2022/0236486 | A1* | 7/2022 | Muñoz Muñoz .... G02B 6/2804 |

FOREIGN PATENT DOCUMENTS

| | | |
|---|---|---|
| WO | 2020041067 A1 | 2/2020 |
| WO | 2022120250 A1 | 6/2022 |
| WO | 2022120253 A1 | 6/2022 |

OTHER PUBLICATIONS

International Search Report and Written Opinion for International Application No. PCT/US2022/036056, dated Sep. 8, 2022, 13 pages.
International Search Report and Written Opinion for International Application No. PCT/US2022/036058, dated Nov. 9, 2022, 12 pages.
International Search Report and Written Opinion for International Application No. PCT/US2022/037012, dated Nov. 15, 2022, 11 pages.
International Search report and Written Opinion for International Application No. PCT/US2022/036987, dated Oct. 19, 2022, 11 pages.
International Search Report and Written Opinion for International Application No. PCT/US2022/037357 dated Sep. 23, 2022, 11 pages.

* cited by examiner

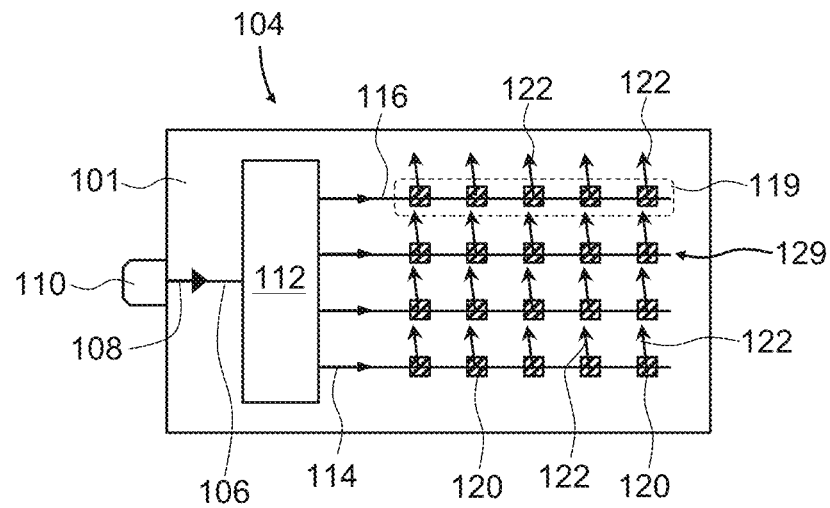
FIG. 1
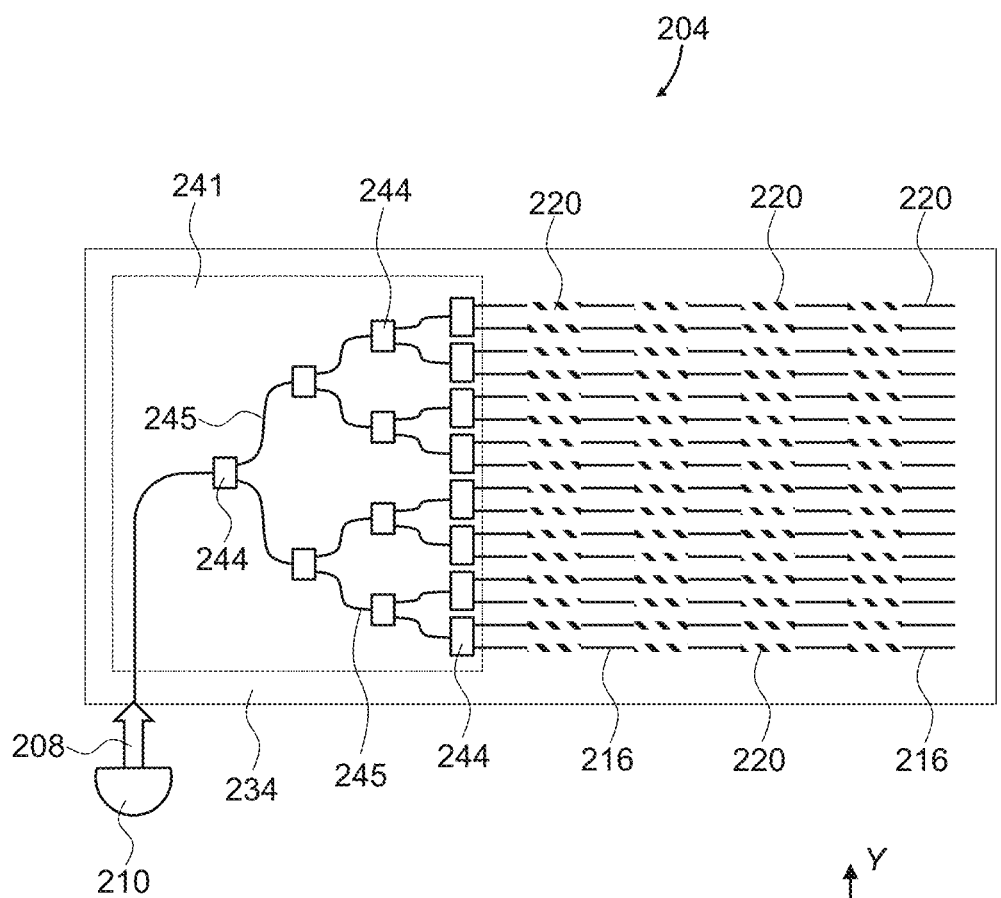
FIG. 2
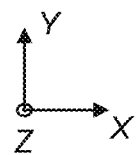

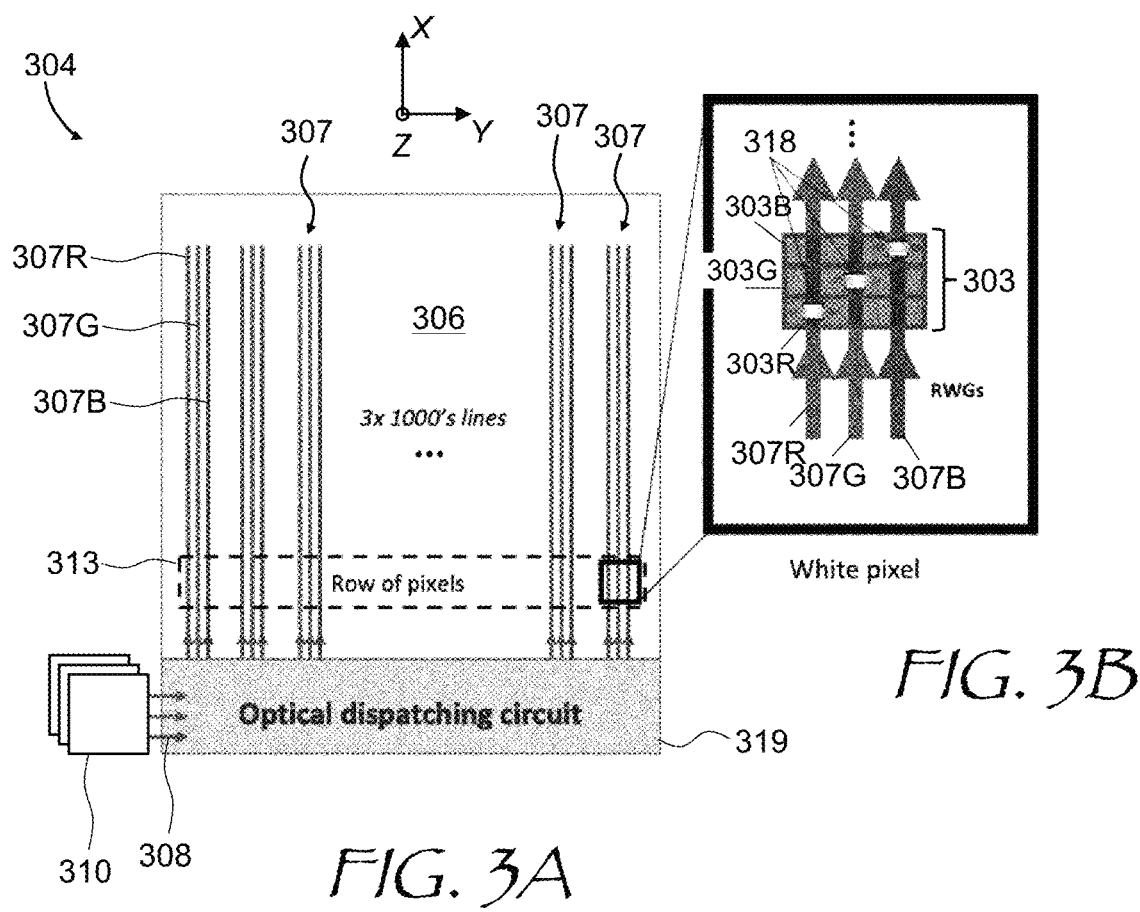
FIG. 3A
FIG. 3B
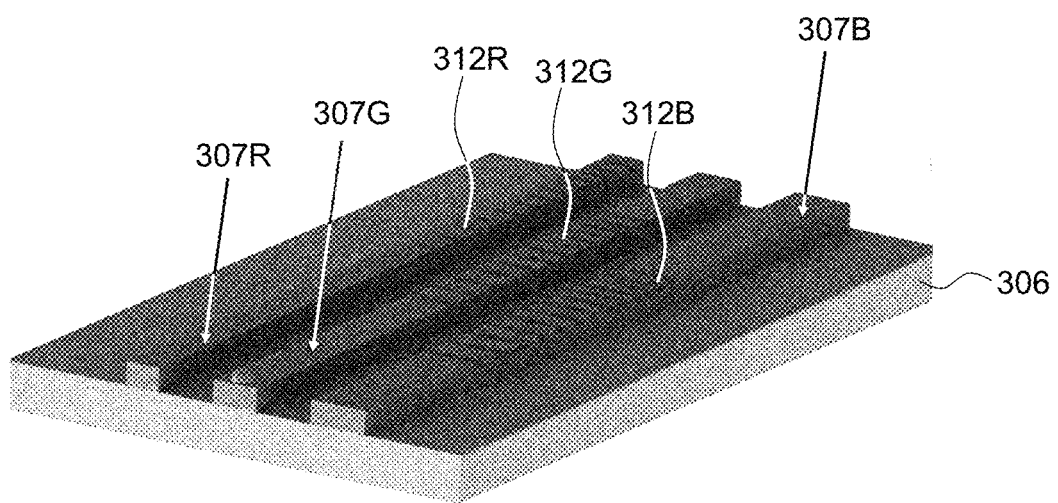
FIG. 3C

DISPLAY DEVICE WITH WAVEGUIDE-BASED TALBOT ILLUMINATOR

REFERENCE TO RELATED APPLICATION

This application claims priority from U.S. Provisional Patent Application No. 63/222,224 entitled "Single Mode Backlight Illuminator", filed on Jul. 15, 2021 and incorporated herein by reference in its entirety.

TECHNICAL FIELD

The present disclosure relates to illuminators, visual display devices, and related components and modules.

BACKGROUND

Visual displays provide information to viewer(s) including still images, video, data, etc. Visual displays have applications in diverse fields including entertainment, education, engineering, science, professional training, advertising, to name just a few examples. Some visual displays such as TV sets display images to several users, and some visual display systems such s near-eye displays (NEDs) are intended for individual users.

An artificial reality system generally includes an NED (e.g., a headset or a pair of glasses) configured to present content to a user. The near-eye display may display virtual objects or combine images of real objects with virtual objects, as in virtual reality (VR), augmented reality (AR), or mixed reality (MR) applications. For example, in an AR system, a user may view images of virtual objects (e.g., computer-generated images (CGIs)) superimposed with the surrounding environment by seeing through a "combiner" component. The combiner of a wearable display is typically transparent to external light but includes some light routing optic to direct the display light into the user's field of view.

Because a display of HMD or NED is usually worn on the head of a user, a large, bulky, unbalanced, and/or heavy display device with a heavy battery would be cumbersome and uncomfortable for the user to wear. Consequently, head-mounted display devices benefit from a compact and efficient configuration, including efficient light sources and illuminators providing illumination of a display panel, high-throughput ocular lenses, and other optical elements in the image forming train.

BRIEF DESCRIPTION OF THE DRAWINGS

Exemplary embodiments will now be described in conjunction with the drawings, in which:

FIG. 1 is a schematic plan view of a waveguide illuminator of the present disclosure;

FIG. 2 is a schematic plan view of an embodiment of the illuminator FIG. 1;

FIG. 3A is a top schematic view of a multi-color waveguide illuminator of this disclosure with surface-relief gratings on ridge waveguides;

FIG. 3B is a top schematic view of a portion of the multi-color waveguide illuminator of FIG. 3A superimposed with a single RGB pixel of a display panel;

FIG. 3C is a three-dimensional schematic view of the ridge waveguides of the multi-color waveguide illuminator of FIG. 3A;

DETAILED DESCRIPTION

Figure 4A:
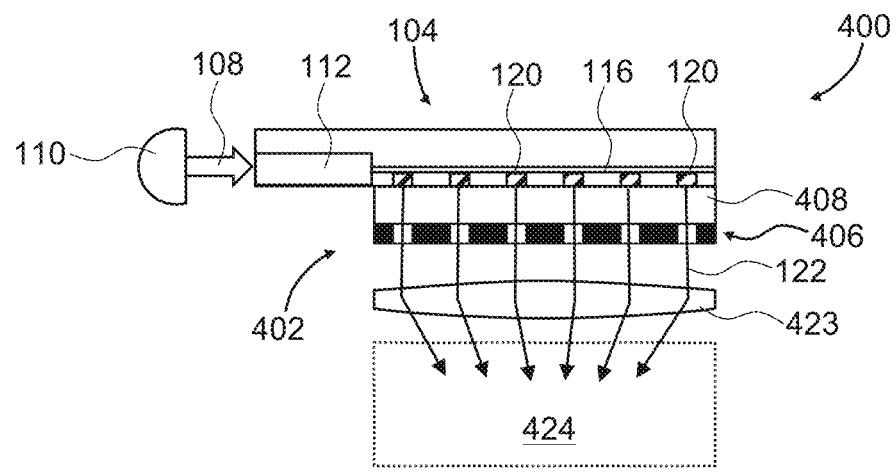
FIG. 4A is a schematic cross-sectional view of a display device of this disclosure.

While the present teachings are described in conjunction with various embodiments and examples, it is not intended that the present teachings be limited to such embodiments. On the contrary, the present teachings encompass various alternatives and equivalents, as will be appreciated by those of skill in the art. All statements herein reciting principles, aspects, and embodiments of this disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As used herein, the terms "first", "second", and so forth are not intended to imply sequential ordering, but rather are intended to distinguish one element from another, unless explicitly stated. Similarly, sequential ordering of method steps does not imply a sequential order of their execution, unless explicitly stated.

In a visual display including an array of pixels coupled to an illuminator, the efficiency of light utilization depends on a ratio of a geometrical area occupied by pixels to a total area of the display panel. For miniature displays often used in near-eye and/or head-mounted displays, the ratio can be lower than 50%. The efficient backlight utilization can be further hindered by color filters on the display panel which on average transmit no more than 30% of incoming light. On top of that, there may exist a 50% polarization loss for polarization-based display panels such as liquid crystal (LC) display panels. All these factors may considerably reduce the light utilization and overall wall plug efficiency of the display, which is undesirable.

In accordance with this disclosure, light utilization and wall plug efficiency of a backlit display may be improved by providing a waveguide illuminator generating a peaky distribution of optical power density at the display panel, with individual peaks of the optical power density overlapping with display pixels. In displays where the illuminator emits light of primary colors, e.g. red, green, and blue, the color of the illuminating light may be matched to the color filters, or the color filters may be omitted altogether. For polarization-based displays, the polarization of the emitted light may be matched to a pre-defined input polarization state. Matching the spatial distribution, transmission wavelength, and/or the transmitted polarization characteristics of the pixels of the display panel enables one to considerably improve the useful portion of display light that is not absorbed or reflected by the display panel on its way to the eyes of the viewer, resulting in a considerable improvement of the display's wall plug efficiency.

Singlemode or few-mode waveguides, e.g. ridge waveguides, in combination with laser illumination, allow for efficient control of such light properties as color and directivity. As light propagates in a single spatial mode, the output can be diffraction-limited and highly directional. Single mode propagation allows one to out-couple light at specific points on the waveguide, and enables incorporation of focusing out-couplers if required. The narrow spectrum of laser illumination enables large color gamut displays. Furthermore, single mode waveguides may preserve polarization, which results in highly polarized output from the backlight unit without the need of polarizer.

Talbot effect may be used to produce a peaky illumination of the display panel. One challenge associated with this approach is alignment of the illuminator to the display panel, which is needed to line up the light spots of the illumination pattern with the pixels of the display panel. Wavelength tuning of the light source may be employed to tune Talbot pattern w.r.t. pixels of the display panel. In some embodiments, the wavelength spectrum of the illuminating light is broad enough to overfill the apertures of pixels of the display panel.

In accordance with the present disclosure, there is provided a display device comprising a display panel and a waveguide illuminator coupled to the display panel. The display panel has an array of pixels on a display substrate. The waveguide illuminator includes: an illuminator substrate; a splitter supported by the illuminator substrate, for splitting an input light beam into a plurality of sub-beams; an array of waveguides supported by the illuminator substrate and running parallel to rows of pixels of the array of pixels, where each waveguide of the array is configured to guide therein a sub-beam of the plurality of sub-beams; and an array of out-coupling gratings coupled to the array of waveguides. The array of out-coupling gratings extends along the array of pixels for out-coupling portions of the sub-beams to propagate through the display substrate and to form an array of Talbot peaks at a plane of the array of pixels. Locations of individual Talbot peaks of the array of Talbot peaks correspond to locations of individual pixels of the array of pixels.

A light source may be provided for generating the input light beam and coupling the input light beam to the splitter. The light source may be tunable in wavelength, and the locations of the individual Talbot peaks may be made to depend on the wavelength of the light source. The wavelength may be selected such that the Talbot peaks are centered on pixels of the array of pixels. Widths of the Talbot peaks of the array of Talbot peaks generally depend on the emission bandwidth of the light source. In some embodiments, the widths of the Talbot peaks may be made larger than widths of pixels of the array of pixels, for overfilling apertures of the pixels to facilitate alignment of the waveguide illuminator to the display panel.

In some embodiments, the array of waveguides comprises ridge waveguides. The gratings of the array of out-coupling gratings may be formed in the ridge waveguides of the array of waveguides.

In embodiments where the light source is a multi-color light source for providing the input light beam comprising light of a plurality of color channels, the splitter may be configured to couple multiple color channels of the plurality of color channels into individual waveguides of the array of waveguides. Each waveguide of the array of waveguides may be configured to guide therein the light of each one of the plurality of color channels. In such embodiments, the waveguide illuminator may further include a color-selective reflector in an optical path between the array of out-coupling gratings and the substrate of the display panel.

The color-selective reflector may be configured to provide different optical path lengths for the light of different color channels of the plurality of color channels. To that end, the color-selective reflector may include a stack of dichroic reflectors configured to reflect the portions of the sub-beams out-coupled by the array of out-coupling gratings to propagate back through the illuminator substrate to impinge onto the pixels of the array of pixels. Alternatively or in addition, the splitter may be configured to couple different color channels of the plurality of color channels into different waveguides of the array of waveguides, the different waveguides being disposed at different depths within the illuminator substrate.

In accordance with the present disclosure, there is provided a method for coupling a display panel comprising an array of pixels to a waveguide illuminator comprising an array of out-coupling gratings coupled to an array of waveguides in which a plurality of sub-beams of an input light beam propagate in the waveguides parallel to rows of the array of pixels. The method includes using the array of out-coupling gratings to out-couple portions of the sub-beams propagating in the array of waveguides, to propagate through a substrate of the display panel towards the array of pixels; forming an array of Talbot peaks at a plane of the array of pixels; and tuning a center wavelength of the light beam to center locations of individual Talbot peaks of the array of Talbot peaks on pixels of the array of pixels. The method may further include using a light source to provide the input light beam, and using a splitter coupled to the array of waveguides to split the input light beam provided by the light source.

In embodiments where the method uses a multi-color light source to the input light beam comprising light of a plurality of color channels, the method may further include using a color-selective reflector in an optical path between the array of out-coupling gratings and the display panel to provide different optical path lengths for the light of different color channels of the plurality of color channels. The method may also include using a splitter to couple different color channels of the plurality of color channels into different waveguides of the array of waveguides, the different waveguides being disposed at different depths within a substrate of the illuminator.

In accordance with the present disclosure, there is further provided a method for coupling a display panel comprising an array of pixels to a waveguide illuminator comprising an array of out-coupling gratings coupled to an array of waveguides. The method includes using a light source to provide an input light beam having an emission bandwidth; using a splitter to split the input light beam into a plurality of sub-beams; propagating the plurality of sub-beams in the waveguides parallel to rows of the array of pixels; using the array of out-coupling gratings to out-couple portions of the sub-beams propagating in the array of waveguides, to propagate through a substrate of the display panel towards the array of pixels; and forming an array of Talbot peaks at a plane of the array of pixels.

Widths of the Talbot peaks of the array of Talbot peaks may generally depend on the emission bandwidth of the light source. The widths of the Talbot peaks may be made larger than widths of pixels of the array of pixels, for overfilling apertures of the pixels to facilitate alignment of the waveguide illuminator to the display panel.

In embodiments where the light source is a multi-color light source providing the input light beam comprising light of a plurality of color channels and the splitter couples multiple color channels of the plurality of color channels into individual waveguides of the array of waveguides, the method may further include using a color-selective reflector in an optical path between the array of out-coupling gratings and the display panel to provide different optical path lengths for the light of different color channels of the plurality of color channels.

In some embodiments, the splitter may couple different color channels of the plurality of color channels into different waveguides of the array of waveguides, the different waveguides being disposed at different depths within a substrate of the illuminator.

Referring now to FIG. 1, a waveguide illuminator 104 includes an illuminator substrate 101 supporting an input waveguide 106 for guiding an input light beam 108. The input light beam 108 may be provided by a light source 110, e.g. a laser source. Herein, the term "waveguide" denotes a light guiding structure that bounds the light propagation in two dimensions, like a light wire, and guides the light in a single transversal mode, or in several transversal modes, e.g. up to 12 modes of propagation. A waveguide may be straight, curved, etc. One example of a waveguide is a ridge-type waveguide. The waveguide illuminator 104 may be implemented in a photonic integrated circuit (PIC).

A waveguide splitter 112 is coupled to the input waveguide 106. The function of the waveguide splitter 112 is to split the input light beam 108 into a plurality of sub-beams 114. An array of waveguides 116 is coupled to the waveguide splitter 112 for guiding the sub-beams 114 in the waveguides 116. The waveguides 116 run parallel to one another as illustrated. Each waveguide 116 is configured to guide one of the sub-beams 114 from the waveguide splitter 112 to an end 129 of the waveguide 116.

An array of rows 119 of out-coupling gratings 120 is supported by the substrate 101 of the waveguide illuminator 104. Each row 119 of the out-coupling gratings 120 is coupled to a waveguide 116 of the waveguide array along a length of the waveguide 116, for out-coupling portions 122 of one of the sub-beams 114 propagating in the waveguide 116. The portions 122 out-coupled by all rows 119 of the out-coupler 120 form a two-dimensional array of the sub-beam portions 122 out-coupled from the waveguide array and exiting at an angle, e.g. an acute or straight angle, to the substrate 101. X- and Y-pitch of the two-dimensional array of the sub-beam portions 122 may, but do not have to, match X- and Y-pitch of a display panel illuminated by the waveguide illuminator 104.

Referring now to FIG. 2, a waveguide illuminator 204 includes a light source 210 and a PIC 234. The light source 210 provides an input light beam 208 to the PIC 234. The PIC 234 includes an optical dispatching circuit 241 coupled to the light source 210. The optical dispatching circuit 241 is configured to receive and split the light beam 208 into a plurality of sub-beams propagating in individual waveguides. To split the light beam 208 into a plurality of sub-beams, the optical dispatching circuit 241 may include a binary tree of 1×2 waveguide splitters 244 coupled to one another by waveguides 245. Other configurations of the optical dispatching circuit 241 are possible, e.g. they may be based on a tree of Mach-Zehnder interferometers, slab waveguide interferometers, etc., and may include separate waveguide trees for light source components at different wavelengths, e.g. wavelengths of different color channels.

The PIC 234 further includes an array of waveguides 216 coupled to the optical dispatching circuit 241 for receiving the sub-beams from the optical dispatching circuit 241. The waveguides 216 run parallel to one another to propagate the sub-beams in them. The PIC 234 further includes an array of out-coupling gratings 220 optically coupled to waveguides 216 of the array of waveguides for out-coupling portions of the sub-beams propagating in the waveguides 216. The out-coupling gratings 220 are disposed parallel to the XY plane as shown, and perform a same or similar function as the out-coupling gratings 120 of the waveguide illuminator 104 of FIG. 1. The out-coupling gratings 220 out-couple the sub-beam portions from the respective waveguides 216 to propagate through a substrate of a display panel and form arrays of optical power density peaks due to Talbot effect at a Talbot plane spaced apart from the array of out-coupling gratings 220, as will be explained in more detail below.

FIGS. 3A to 3C illustrate a possible implementation of the PIC 234 of FIG. 2. Referring first to FIGS. 3A and 3B, a PIC illuminator 304 includes a substrate 306 and an array of waveguides 307 supported by the substrate 306 and running along an array of pixels of a display panel to be illuminated. In the PIC illuminator 304 shown in FIG. 3A, the waveguides 307 include an array of "red waveguides" 307R for conveying light at a red wavelength, an array of "green waveguides" 307G for conveying light at a green wavelength, and an array of "blue waveguides" 307B for conveying light at a blue wavelength. Light 308 at different wavelengths may be generated by a multi-wavelength light source 310 and distributed among different waveguides 307R, 307G, and 307B by an optical dispatching circuit 319, which is a part of the PIC. The function of the optical dispatching circuit 319 is to expand the light along Y-direction and to reroute the light into the array of waveguides 307. The optical dispatching circuit 319 may include a binary tree of splitters, similar to the optical dispatching circuit 241 of FIG. 2. One row of pixels of the display panel may be disposed across all the waveguides 307R, 307G, and 307B of red, green, and blue color channels respectively, the waveguides extending vertically in FIG. 3A. A row of pixels is outlined with dashed rectangle 313 in FIG. 3A.

FIG. 3B is a magnified view of three color channel waveguides under a single pixel 303 of the display panel. Each of the three color sub-pixels corresponds to one of a red (R), green (G), and blue (B) color channel of the image, respectively. More than three color sub-pixels may be provided, e.g. in a RGGB scheme. Light portions may be out-coupled, or redirected, from the ridge waveguides 307R, 307G, and 307B by the respective gratings 312R, 312G, and 312B shown in FIG. 3C forming corresponding arrays of gratings for each color channel. The gratings 312R, 312G, and 312B may be chirped for focusing the out-coupled light beam in a direction along the waveguides, i.e. vertically in FIGS. 3A and 3B i.e. along X-axis. Additionally, the grating groove can be curved, to focus light in the horizontal direction, in FIGS. 3A and 3B i.e. along Y-axis. In the example of FIG. 3C, gratings 312R, 312G, and 312B are formed in waveguides 307R, 307G, and 307B respectively, although in some embodiments the arrays of gratings may be formed separately and optically coupled to the array of waveguides 307.

For focusing the out-coupled light beams in horizontal direction in FIG. 3B, 1D microlenses 318 may be provided as shown. Herein, the term "1D microlenses" denotes lenses that focus light predominantly in one dimension, e.g. cylindrical lenses. 2D lenses, i.e. lenses focusing light in two orthogonal planes, may be provided instead of 1D lenses. The array of microlenses 318 disposed in an optical path between the gratings 312R, 312G, and 312B and the pixels 303R, 303G, and 303B may be used to at least partially focus of the light redirected by the gratings 312R, 312G, and 312B for propagation through corresponding sub-pixels 303R, 303G, and 303B. The configuration is shown in FIG. 3B for one white pixel 303. The white pixel configuration may be repeated for each white pixel of the display panel.

FIG. 4A illustrates a display device 400 using the waveguide illuminator 104 of FIG. 1. The waveguide illuminator 204 of FIG. 2 and/or the PIC illuminator 304 of FIG. 3A may also be used. The display device 400 of FIG. 4A includes a display panel 402 illuminated by the waveguide illuminator 104. The display panel 402 includes an array of pixels 406 supported by a display substrate 408. By way of a non-limiting example, the display panel 402 may be a liquid crystal (LC) panel including a thin layer of LC fluid between a pair of substrates, one of the substrates carrying an array of electrodes defining transmissive LC pixels. The light source 110 provides the input light beam 108, which is split by the splitter 112 into sub-beams propagating in waveguides 116 of the waveguide array as explained above with reference to FIG. 1. The out-coupling gratings 120 out-couple the portions 122 of the sub-beams 114 from the waveguide illuminator 104 such that the out-coupled light beam portions 122 propagate through the display substrate 408 and form an array of optical power density peaks 422 (FIG. 4B) at the array of pixels 406 due to Talbot effect illustrated further below in FIGS. 5 and 6. Locations of the optical power density peaks 422 (FIG. 4) correspond to locations of the pixels 406, e.g. the optical power density peaks 422 may be centered on the pixels 406. Due to the centering of the optical power density peaks 422 on the pixels 406, most of the illuminating light propagates through the pixels 406 and does not get blocked by opaque inter-pixel areas 407, improving the overall light throughput and, consequently, wall plug efficiency of the display device 400. One peak 422 may be provided per one pixel 406 as shown. In some embodiments, a distance between the peaks 422 may be equal to M times p, where p is a pitch of the array of pixels, and M is an integer ≥1. For example, in embodiments where Talbot pattern is produced at several wavelengths of the illuminating light, one peak 422 at a wavelength of a particular color channel may be provided per color sub-pixel of the pixel array, several sub-pixels forming one RGB pixel.

The light beam portions 122 formed the array of Talbot peaks 422 get spatially modulated by the array of pixels 406, and propagate towards an ocular lens 423. The ocular lens 423 collimates the light beam portions 122 and redirects them towards an eyebox 424 of the display device 400. The function of the ocular lens 423 is to form an image in angular domain at the eyebox 424 from an image in linear domain displayed by the display panel 402. Herein, the term "image in linear domain" means an image where individual pixels of the image are represented by a coordinate of a light beam having color and/or brightness representing color and/or brightness of those pixels. Accordingly, the term "image in angular domain" means an image where individual pixels of the image are represented by a beam angle of a light beam having color and/or brightness representing color and/or brightness of those pixels.

Figure 5:
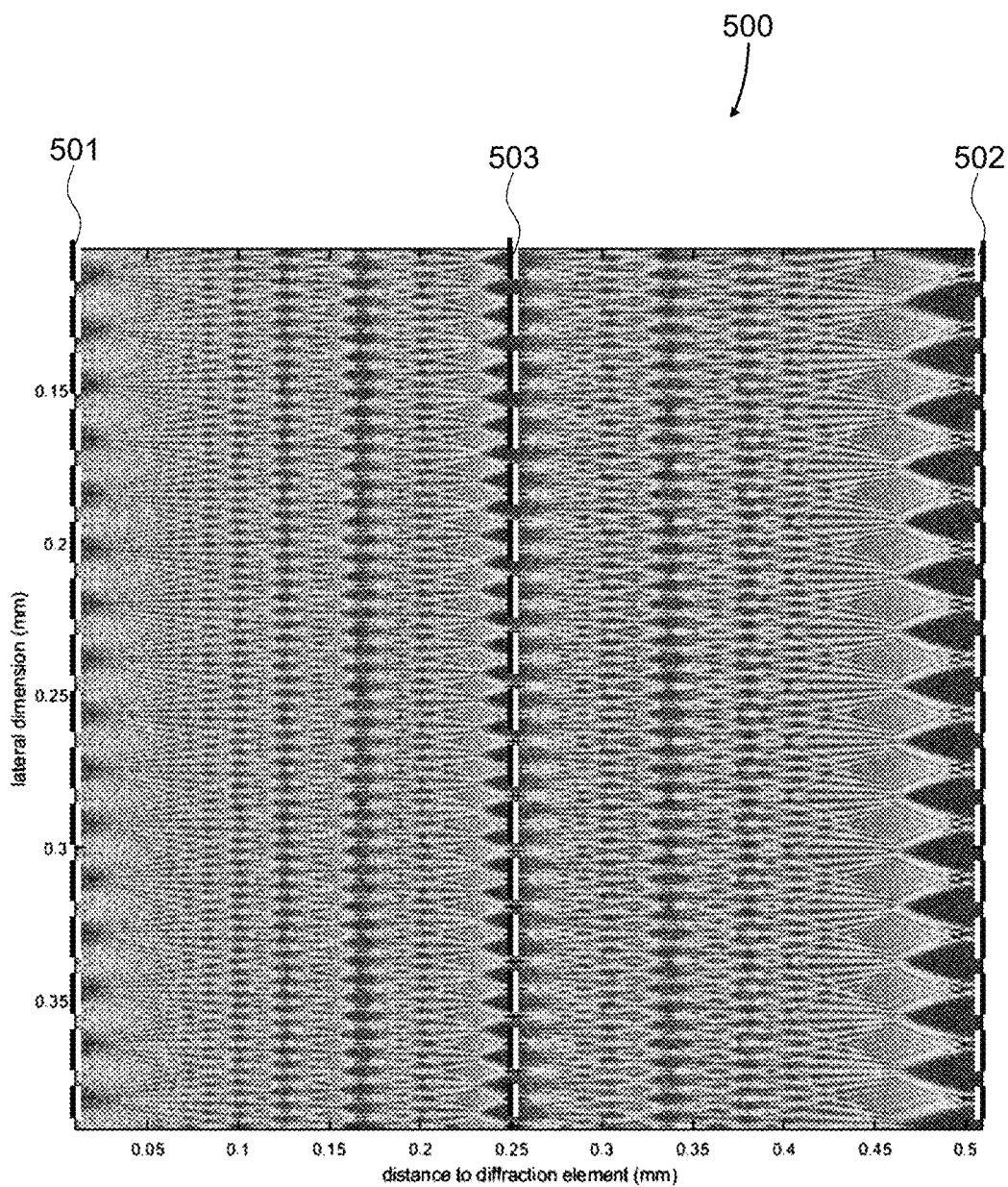
FIG. 5 is a computed Talbot map of an optical power density distribution through a thickness a display panel substrate of the display device of FIG. 4A.

FIG. 5 shows a Talbot fringe pattern 500 in the display substrate 408 (FIG. 4A) of the display panel 402 as an optical power density map. The horizontal direction in FIG. 5 is the direction of thickness through the substrate of the display panel 402. The Talbot fringe pattern 500 originates at a first plane 501 disposed parallel to the XY plane in FIG. 4A. The out-coupling gratings 120 are disposed in the first plane 501. Light propagates from left to right in FIG. 5, forming arrays of optical power density peaks at various distances from the first plane 501. The optical power density distribution at the first plane 501 is repeated at a second plane 502 separated from the first plane 501 by a Talbot pattern period T, which is equal to 0.5 mm in this example. The array of pixels 406 may be located at the second plane 502. For embodiments where the array of out-coupling gratings 120 is disposed at a surface of the illuminator joining the display substrate 408 as shown in FIG. 4A, the Talbot pattern period (in a direction of thickness of the display substrate 408) may be simply equal to a thickness of the substrate.

More generally, a distance D between a plane of the out-coupling gratings and a plane of the pixels may include only a fraction of the Talbot pattern, or several such patterns, according to the following Eq. (1)

$$D = K\, T^2/(N\lambda),\qquad(1)$$

where K and N are integers ≥1, and where λ is a wavelength of the light beam in the display substrate 408. In Eq. (1) above, K is the number of repetitions of the Talbot pattern, and N defines sub-planes of Talbot peaks with a higher pitch. For example, at a middle plane 503 separated form the first 501 and second 502 planes by 0.25 mm, the pitch is doubled.

Figure 6:
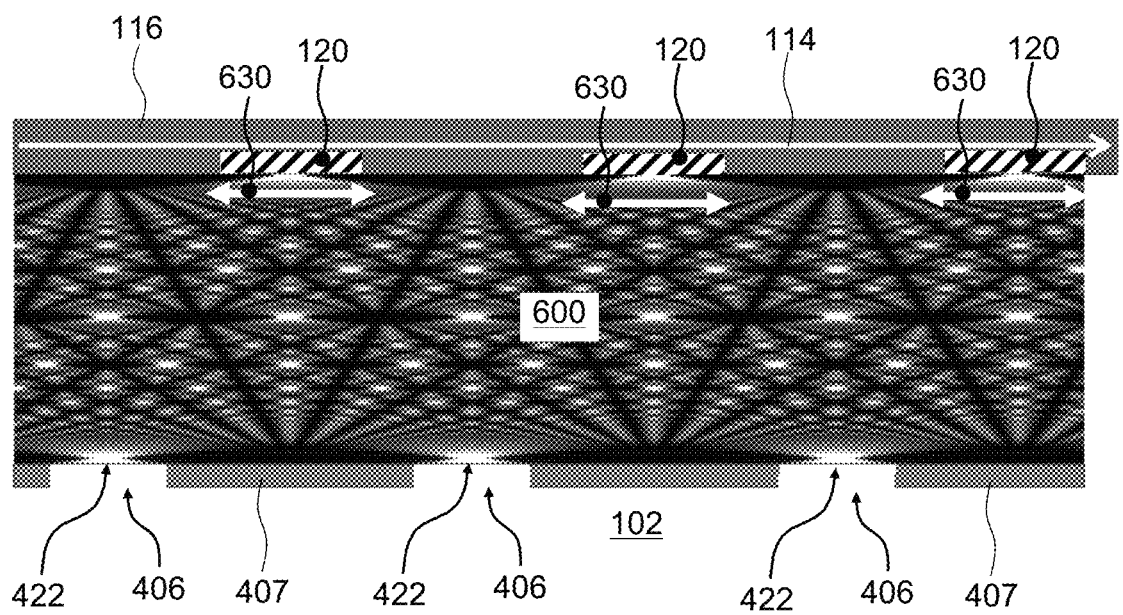
FIG. 6 is a side cross-sectional view of the display device of FIG. 4A showing a Talbot pattern of optical power density inside the display substrate.

Turning to FIG. 6, a Talbot pattern 600 of optical power density distribution inside the display substrate 408 is formed by optical interference between different portions of the sub-beams 114 propagating in the waveguides 116. As such, positions of the optical power density peaks 422 relative to the pixels 406 of the display panel 402 depend on relative phase between the sub-beams 114 portions out-coupled by the out-coupling gratings 120. The relative phase depends on wavelength; accordingly, the optical power density peaks 422 may be shifted by tuning the wavelength of the sub-beams 114. Providing a wavelength-tunable source, e.g. a tunable laser, and tuning the wavelength enables one to center the optical power density peaks 422 on the pixels 406 of the display panel 402. When the wavelength of the light source 110 is tuned, the optical power density peaks 422 shift as indicated with an arrow 630.

Figure 7:
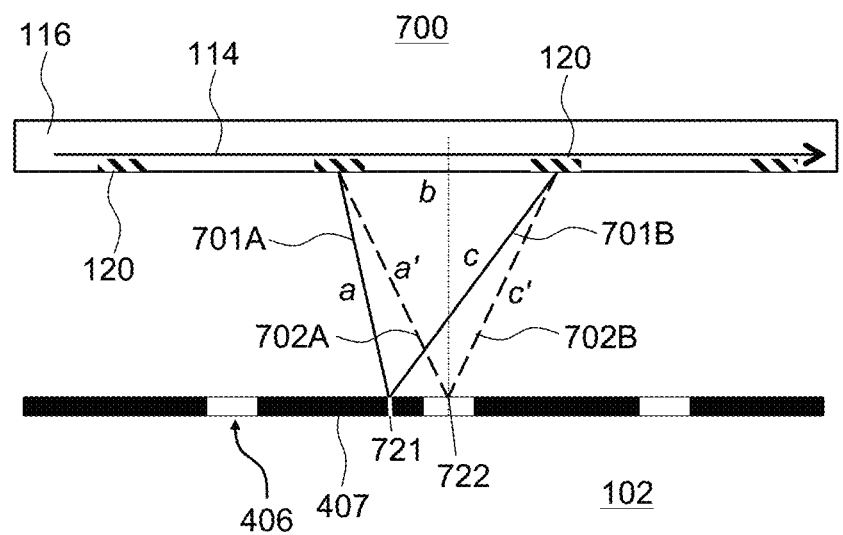
FIG. 7 is a schematic diagram of the cross-sectional view of FIG. 6 illustrating a principle of wavelength tuning of Talbot peaks positions.

The wavelength tuning principle is further illustrated in FIG. 7. A schematic diagram 700 depicts optical paths of out-coupled portions of the sub-beam 114. A first path pair is shown in solid lines. The first path pair results in a local interference maximum 721 at the inter-pixel area 407. A left-side path length 701A is equal to a, and a right-side path length 701B is equal to b+c. The condition of local interference maximum can be written as $$b+c-a=n\lambda, \quad (2)$$

where n is integer and $\lambda$ is wavelength of the sub-beam 114 in the corresponding medium.

A second path pair 702A, 702B is shown in dashed lines. The second path pair results in a local interference maximum 722 centered on the pixel 406. A left-side path length 702A is equal to a', and a right-side path length 701B is equal to b+c', where b is distance between the neighboring out-coupling gratings 120. The condition of local interference maximum for this case can be written as $$b+c'-a'=n\lambda \quad (3a)$$

By selecting the wavelength $\lambda$ such that the condition (3a) is fulfilled, the local interference maxima 722, i.e. the Talbot optical power density peaks 422, may be centered on the pixels 406. When c'=a' as illustrated in FIG. 7, the condition (3a) simplifies to $$b=n\lambda \quad (3b)$$

The adjustment of the locations of the local interference maxima 722 of the Talbot pattern 600 by tuning the wavelength of the light source 110 enables one to maximize the transmission of the light emitted by a waveguide illuminator 104 through the display panel 102 at the time of assembly of the display device 400. Such an adjustment may be particularly beneficial for miniature display panels with small pixels, on the order of several micrometers, and for tight pixel pitches.

Figure 8:
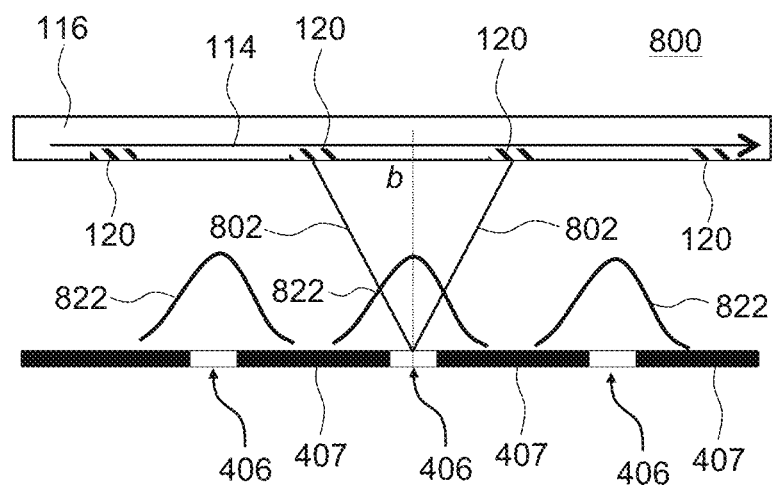
FIG. 8 is a schematic diagram of the cross-sectional view of FIG. 6 illustrating the principle of pixel aperture overfill with broadband illuminating light.

Instead of tuning the wavelength of the light source, one may provide a light source of sufficiently broad bandwidth such that the Talbot peaks overfill apertures of the pixels of the display panel. Referring for an illustrative example to FIG. 8, a schematic diagram 800 depicts an optical path 802 of portions of the sub-beam 114 out-coupled by the out-coupling gratings 120. In this example, it is presumed that the condition (3b) is fulfilled at a center wavelength of the light source, such that local interference maxima occur at centers of the pixels 406 of the display panel 402. The width of Talbot peaks 822 of the array of the Talbot peaks 822 depends on the emission bandwidth of the light source 110. By selecting a sufficiently broad emission bandwidth of the light source, Talbot peaks 822 may be made wide enough such that Talbot peak widths are larger than widths (apertures) of the pixels 406 of the display panel. In other words, the Talbot peaks 822 overfill the apertures of the pixels 406 to facilitate alignment of the waveguide illuminator 104 to the display panel 102.

Figure 9:
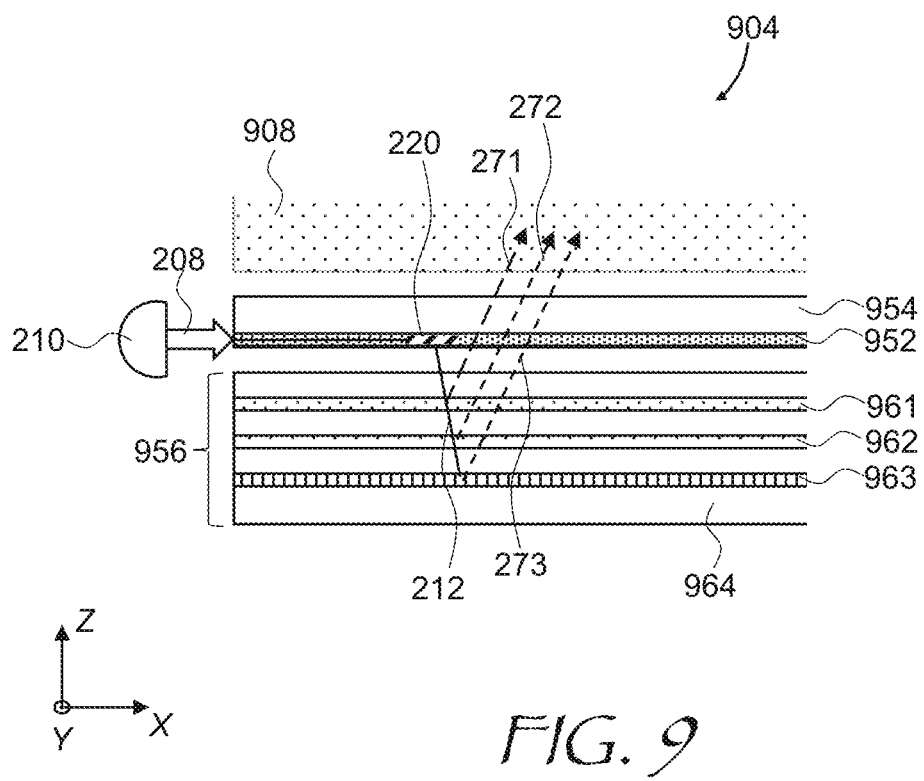
FIG. 9 is a cross-sectional exploded view of an embodiment of a waveguide illuminator with a buried dichroic mirror.

In some embodiments of the display device 400 (FIG. 4A), the light source 110 is a multi-color light source providing the input light beam including a plurality of color channels. Since the Talbot distance D depends on wavelength as defined by Eq. (1) above, the optical configuration of a waveguide illuminator needs to be adapted to overlap the Talbot planes for different color channels at the pixel array of the display panel. In embodiments where the splitter 112 (FIG. 1 and FIG. 4) is configured to couple multiple color channels of the plurality of color channels into individual waveguides 116, light of multiple color channels propagates in the individual waveguides 116 and is out-coupled from a same plane. To make sure that Talbot planes for different color channels overlap at the array of display pixels 406 of the display panel 402 (FIG. 4), an optical component may be provided to make an optical path between the out-coupling gratings 120 and the plane of the pixels 406 wavelength-dependent. Referring to FIG. 9 for a non-limiting illustrative example, a waveguide illuminator 904 includes the elements of the illuminator 204 of FIG. 2. The waveguide structures of the optical dispatching circuit 241, including the waveguide splitters and coupling linear waveguides and the array of straight linear waveguides 220, are formed in a core layer 952 supported by an illuminator substrate 954. The illuminator 904 further includes a color-selective reflector 956 in an optical path of the light beam 208 between the arrays of out-coupling gratings 220 formed in the core layer 952 and a substrate 908 of a display panel. The color-selective reflector 956 is configured to provide different optical path lengths for the light beam components at different wavelengths, i.e. for the light of different color channels. To that end, the color-selective reflector 956 may include a stack of first 961, second 962, and third 963 reflectors supported by a reflector substrate 964 at different depths (i.e. different Z-coordinates) within the reflector substrate 964. The first 961 and second 962 reflectors may be dichroic reflectors. The first reflector 961 reflects light at a first wavelength and transmits light at second and third wavelengths, and the second reflector 962 transmits light at the first and third wavelengths, and reflects the light at the second wavelength. The third reflector 963 may be a 100% mirror reflecting light at all wavelengths, or may also be a dichroic mirror that only reflects light at the third wavelength, to reduce color channel crosstalk.

In operation, the light beam 208 carries first 271, second 272, and third 273 beam components for carrying light at first, second, and third wavelengths, respectively. For example, the first 271, second 272, and third 273 beam components may be at red, green, and blue wavelengths respectively. The out-coupling grating 220 out-couples a light portion 212 carrying all beam components. The first beam component 271 is reflected by the first reflector 961, with the remaining beam components 272 and 273 being transmitted through. The second beam component 272 is reflected by the second reflector 962, with the third beam component 273 being transmitted through. Finally, the third beam component 273 is reflected by the third reflector 963. As a result of the split propagation, different beam components will propagate different distances before they reach the substrate 908 of the display panel. The different distances may be selected to compensate for the different distances to Talbot plane for light at different wavelengths, as defined by Eq. (1) above, causing the peaky Talbot patterns to overlap at the pixel plane of the display panel. The color-selective reflector 956 reflects the portions of the sub-beams (i.e. the beam components of different wavelengths or colors) out-coupled by the array of out-coupling gratings 220 to propagate back through the illuminator substrate 954 to impinge onto the pixels of the display panel.

Figure 10:
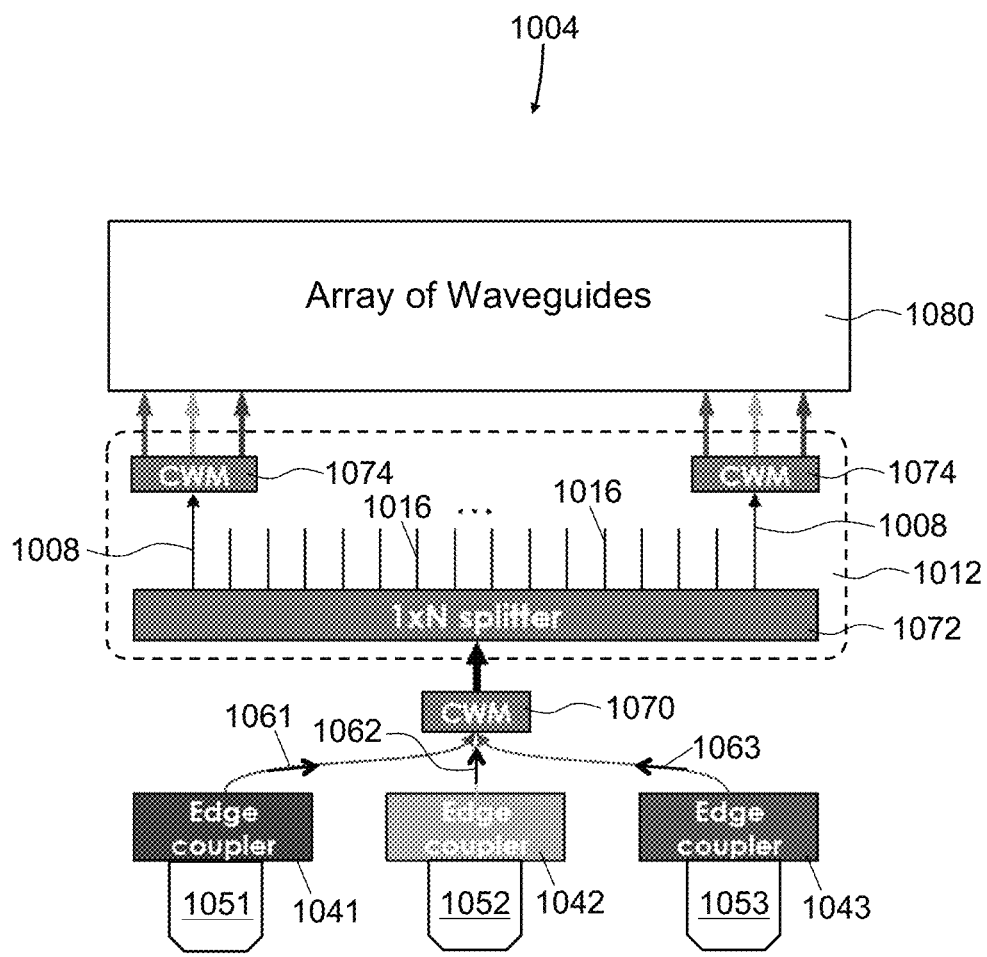
FIG. 10 is a schematic diagram of a multi-color embodiment of the waveguide illuminator of FIG. 4A.

Referring to FIG. 10, a waveguide illuminator 1004 is similar to the waveguide illuminator 104 of FIG. 1, includes similar elements, and may be implemented as a PIC. The waveguide illuminator 1004 of FIG. 10 further includes first 1041, second 1042, and third 1043 in-couplers, e.g. edge in-couplers, for coupling into the waveguide illuminator 1004 light of first 1051, second 1052, and third 1053 light sources, e.g. laser sources. The first 1051, second 1052, and third 1053 light sources may emit light 1061, 1062 and 1063 of first, second, and third color channels respectively such as, for example, red light of a red color channel, green light of a green color channel, and blue light of a blue color channel.

A wavelength multiplexor 1070 is coupled to the first 1041, second 1042, and third 1043 in-couplers for combining the light 1061, 1062 and 1063 of the first, second, and third color channels respectively into the input light beam 108, and coupling the input light beam 108 into the input waveguide 106. The abbreviation "CWM" in FIG. 10 denotes a "coarse" wavelength multiplexor, with wavelengths spaced by 20 nm or more. A waveguide splitter 1012 is an embodiment of the waveguide splitter 112 of the waveguide illuminator 104 of FIG. 1. The waveguide splitter 1012 of FIG. 10 includes a 1×N splitter 1072, where N is an integer, for splitting the input light beam 108 into N portions 1008 each propagating in one of N output waveguides 1016. The a 1×N splitter 1072 may include e.g. an array of 1×2 splitters arranged into a binary tree as in the waveguide illuminator 204 of FIG. 2. The N portions 1008 may all have a same optical power.

The waveguide splitter 1012 further includes N wavelength demultiplexors 1074 each coupled to a particular one of the N output waveguides 1016, for separating light 1061, 1062 and 1063 of the first, second, and third color channels respectively to couple to, and propagate the light of different color channels in different waveguides 116 of a waveguide array 1080. The different waveguides may be disposed at different depths within the illuminator substrate, to make sure that Talbot planes for the light 1061, 1062 and 1063 of the first, second, and third color channels overlap on the pixel array plane of the display panel. In other words, the different depths of the waveguide of the waveguide array 1080 may be selected such that Talbot peaks of the light of different color channels are focused at the pixel plane.

Figure 4B:
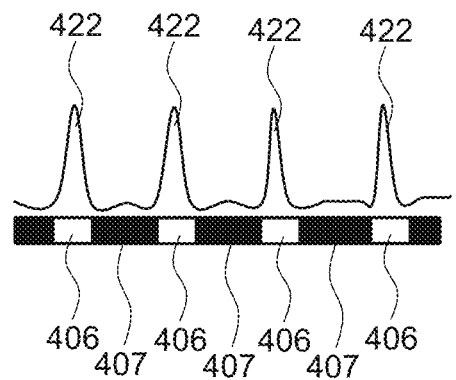
FIG. 4B is a magnified cross-sectional view of a pixel array of the display device of FIG. 4A superimposed with peaky Talbot optical power density distribution of the illuminating light at the pixel array.
Figure 11:
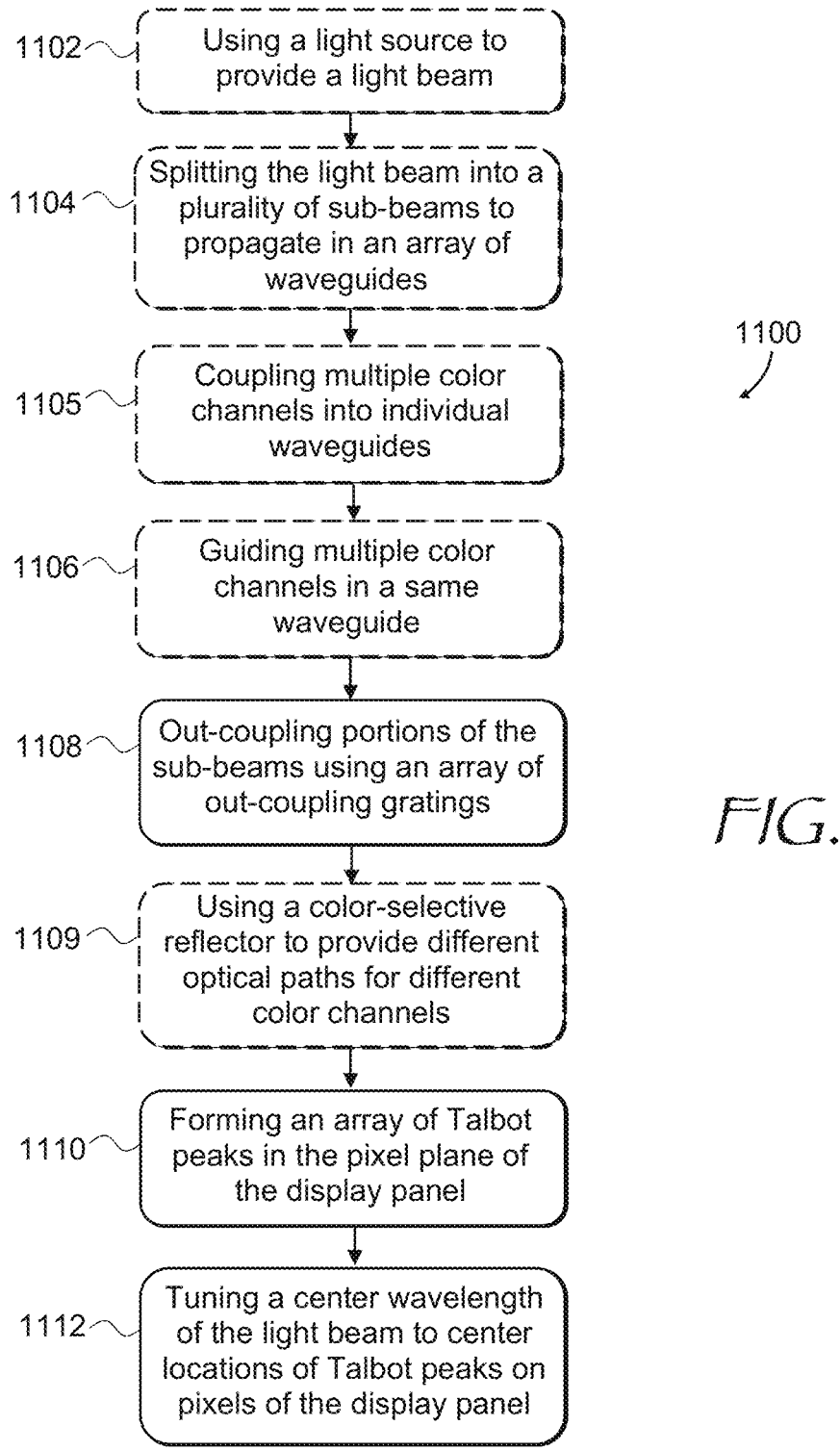
FIG. 11 is a flow chart of a method for coupling a waveguide illuminator to a display panel with wavelength tuning.

Turning to FIG. 11 with further reference to FIGS. 1, 4A, and 4B, a method 1100 for coupling a display panel, e.g. the display panel 402 of FIG. 4A, to a waveguide illuminator, e.g. the waveguide illuminator 104 of FIGS. 1 and 4A, is presented. Optional steps of the method 1100 are denoted with dashed-line rectangles. The method 1100 of FIG. 11 may include using a light source, e.g. the light source 110 of FIG. 4A, to provide (1102) an input light beam. The light source 110 may be a single-color or a multi-color light source. The method 1100 may include using a splitter, e.g. the splitter 112 coupled to the array of waveguides 116, to split (1104) the input light beam provided by the light source 110. The method 1100 includes using an array of out-coupling gratings, e.g. the out-coupling gratings 120 (FIG. 4A) to out-couple (1108) portions of the sub-beams propagating in the array of waveguides, to propagate through the substrate 408 of the display panel 402 towards the array of pixels 406. An array of Talbot peaks (e.g. the Talbot peaks 422 in FIG. 4B) is formed (1110) at a plane of the array of pixels 406. A center wavelength of the light beam 108 provided by the light source 108 is tuned (1112) to center locations of individual Talbot peaks 422 of the array of Talbot peaks on the pixels 406 of the array of pixels.

In embodiments where the light source 110 is a multi-color light source generating the input light beam carrying light of a plurality of color channels, the method 1100 may include using a splitter to couple (1105) multiple color channels of the plurality of color channels into individual waveguides of the array of waveguides, followed by guiding (1106) the light of each one of the plurality of color channels in each waveguide of the array of waveguides. A color-selective reflector, e.g. the color-selective reflector 956 of FIG. 9, may be used (FIG. 11; 1109) in an optical path between the array of out-coupling gratings and the display panel to provide different optical path lengths for the light of different color channels of the plurality of color channels, as explained above with reference to FIG. 9.

Figure 12:
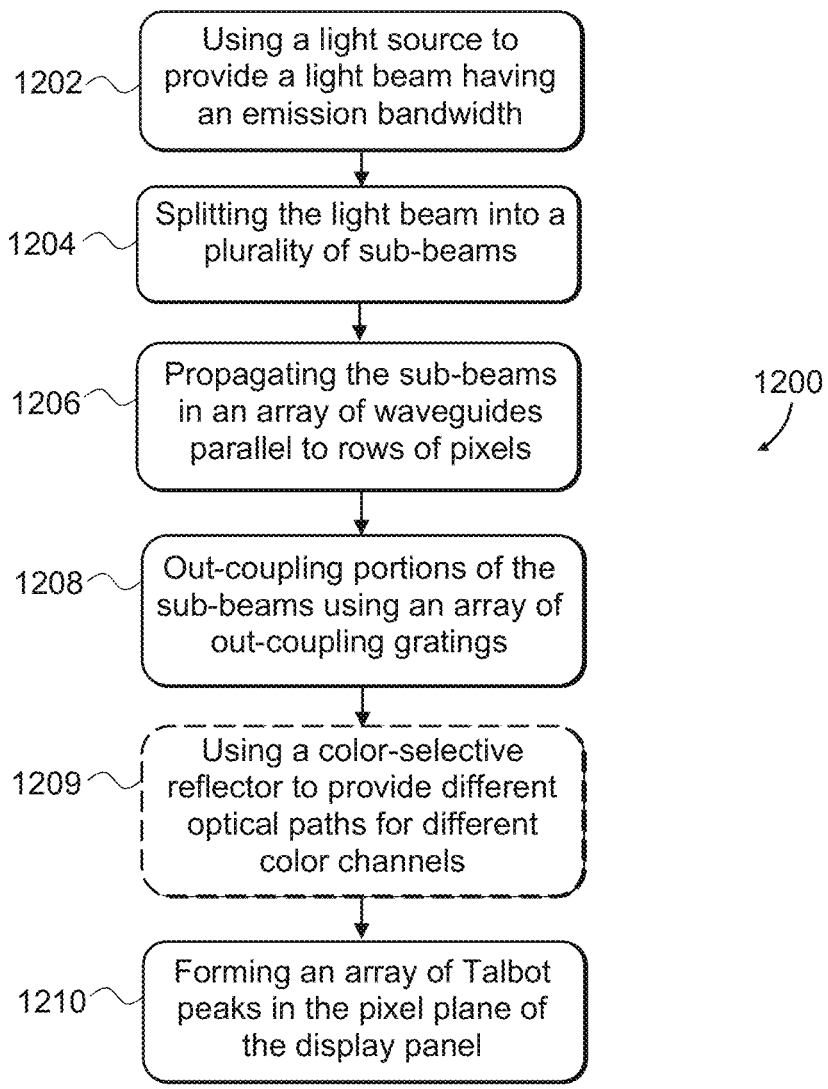
FIG. 12 is a flow chart of a method for coupling a waveguide illuminator to a display panel with pixel aperture overfill.

FIG. 12 illustrates a method 1200 for coupling a display panel, e.g. the display panel 402 of FIG. 4A, to a waveguide illuminator, e.g. the waveguide illuminator 104 of FIGS. 1 and 4A, and/or the waveguide illuminator 1004 of FIG. 10. The method 1200 includes using a light source to provide (1202) the input light beam having an emission bandwidth that is sufficiently broad. A splitter, e.g. the splitter 112 in FIG. 1 or the splitter 1012 in FIG. 10, is used to split (FIG. 12; 1204) the input light beam into a plurality of sub-beams. The plurality of sub-beams is propagated (1206) in the waveguides parallel to rows of the array of pixels. The array of out-coupling gratings is used to out-couple (1208) portions of the sub-beams propagating in the array of waveguides, to propagate through a substrate of the display panel towards the array of pixels as illustrated in FIG. 4A, for example. The method 1200 further includes forming (1210) an array of Talbot peaks at a plane of the array of pixels as illustrated e.g. in FIG. 4B. The widths of the Talbot peaks of the array of Talbot peaks depend on the emission bandwidth of the light source. To facilitate alignment of the waveguide illuminator to the display panel, the bandwidth should be broad enough such that the widths of the Talbot peaks are larger than widths of pixels of the array of pixels, for overfilling apertures of the pixels as was explained above and illustrated in FIG. 8.

In some embodiments, the light source may include a multi-color light source providing the input light beam comprising light of a plurality of color channels. The splitter 112 may couple multiple color channels of the plurality of color channels into individual waveguides 116 of the array of waveguides. In such embodiments, the method 1200 may also include using a color-selective reflector, e.g. the color-selective reflector 956 of FIG. 9, in an optical path between the array of out-coupling gratings and the display panel to provide different optical path lengths (dashed rectangle at 1209) for the light of different color channels of the plurality of color channels. Alternatively, light of different color channels may be coupled in different waveguides of the waveguide array, as in the waveguide illuminator 1004 of FIG. 10, for example. For such embodiments, waveguides carrying light of different color channels may be disposed at different depths within a substrate of the illuminator to achieve the same goal of providing different optical path lengths for the light of different color channels of the plurality of color channels.

Figure 13:
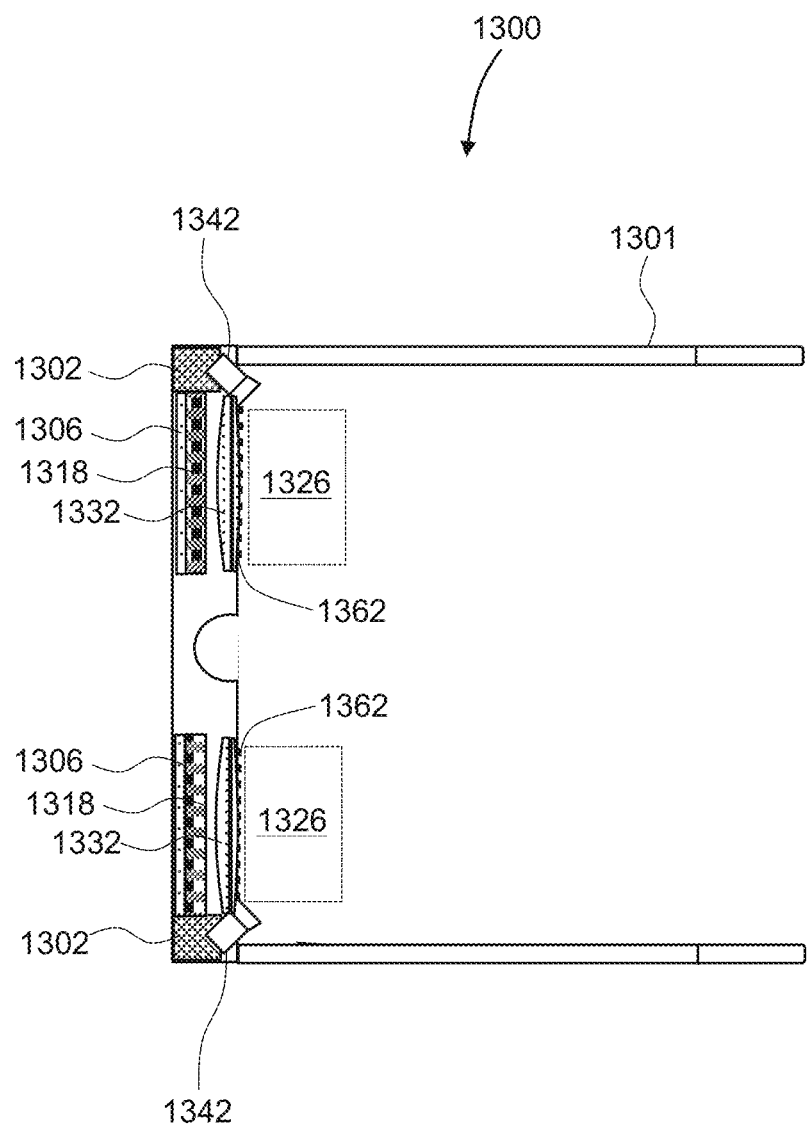
FIG. 13 is a view of an augmented reality (AR) display of this disclosure having a form factor of a pair of eyeglasses.

Turning to FIG. 13, a virtual reality (VR) near-eye display 1300 includes a frame 1301 supporting, for each eye: a light source 1302, a waveguide illuminator 1306 operatively coupled to the light source 1302 and including any of the waveguide illuminators disclosed herein; (the light source may be built into the illuminator); a display panel 1318 including an array of display pixels, where positions of the out-coupling gratings in the waveguide illuminator 1306 are coordinated with positions of the polarization-tuning pixels of the display panel 1318; and an ocular lens 1332 for converting the image in linear domain generated by the display panel 1318 into an image in angular domain for direct observation at an eyebox 1326. A plurality of eyebox illuminators 1362, shown as black dots, may be placed onto the side of the waveguide illuminator 1306 that faces the eyebox 1326. An eye-tracking camera 1342 may be provided for each eyebox 1326.

The purpose of the eye-tracking cameras 1342 is to determine position and/or orientation of both eyes of the user. The eyebox illuminators 1362 illuminate the eyes at the corresponding eyeboxes 1326, allowing the eye-tracking cameras 1342 to obtain the images of the eyes, as well as to provide reference reflections i.e. glints. The glints may function as reference points in the captured eye image, facilitating the eye gazing direction determination by determining position of the eye pupil images relative to the glints images. To avoid distracting the user with the light of the eyebox illuminators 1362, the latter may be made to emit light invisible to the user. For example, infrared light may be used to illuminate the eyeboxes 1326.

Figure 14:
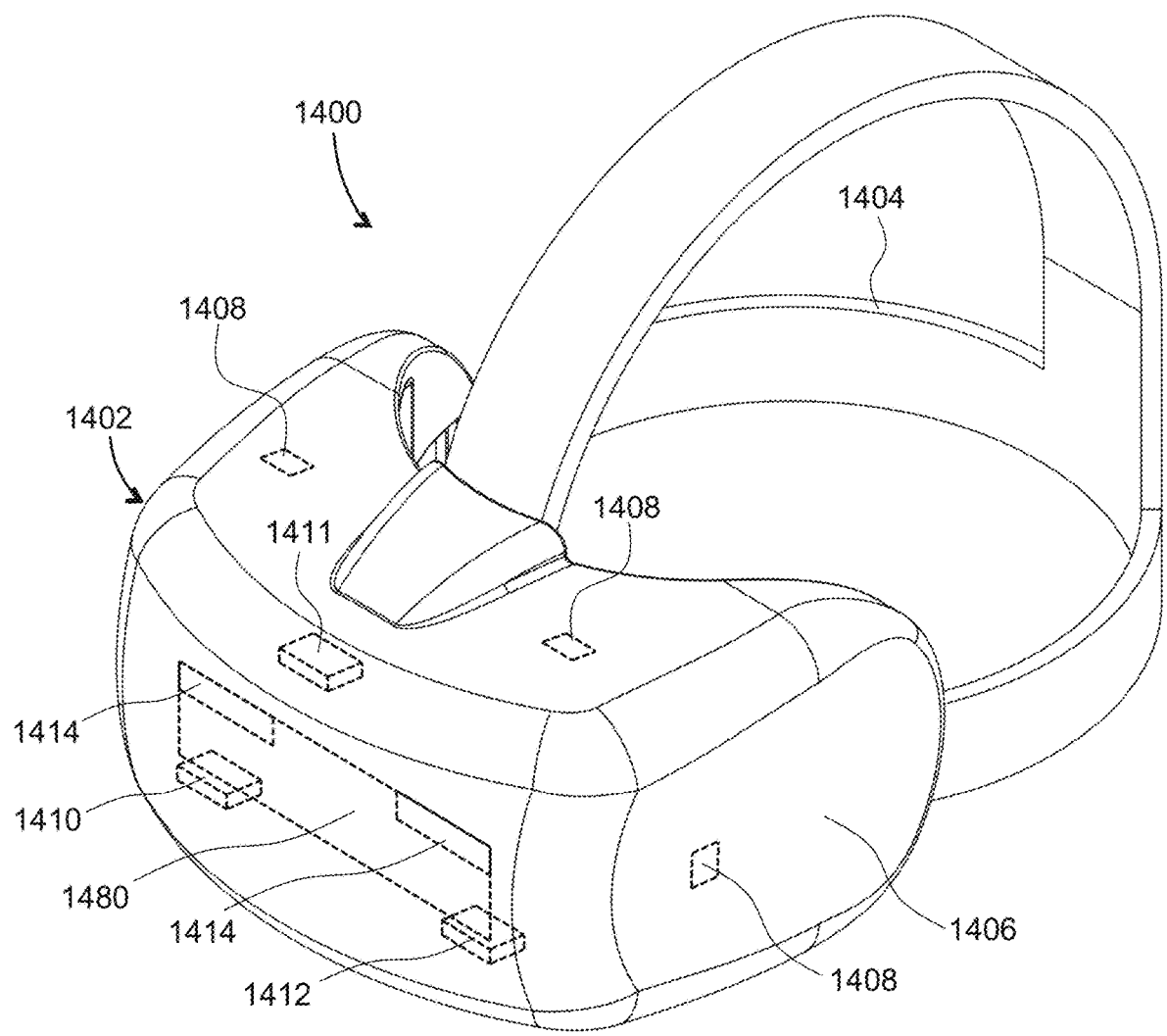
FIG. 14 is a three-dimensional view of a head-mounted display (HMD) of this disclosure.

Turning to FIG. 14, an HMD 1400 is an example of an AR/VR wearable display system which encloses the user's face, for a greater degree of immersion into the AR/VR environment. The HMD 1400 may generate the entirely virtual 3D imagery. The HMD 1400 may include a front body 1402 and a band 1404 that can be secured around the user's head. The front body 1402 is configured for placement in front of eyes of a user in a reliable and comfortable manner. A display system 1480 may be disposed in the front body 1402 for presenting AR/VR imagery to the user. The display system 1480 may include any of the display devices and illuminators disclosed herein. Sides 1406 of the front body 1402 may be opaque or transparent.

In some embodiments, the front body 1402 includes locators 1408 and an inertial measurement unit (IMU) 1410 for tracking acceleration of the HMD 1400, and position sensors 1412 for tracking position of the HMD 1400. The IMU 1410 is an electronic device that generates data indicating a position of the HMD 1400 based on measurement signals received from one or more of position sensors 1412, which generate one or more measurement signals in response to motion of the HMD 1400. Examples of position sensors 1412 include: one or more accelerometers, one or more gyroscopes, one or more magnetometers, another suitable type of sensor that detects motion, a type of sensor used for error correction of the IMU 1410, or some combination thereof. The position sensors 1412 may be located external to the IMU 1410, internal to the IMU 1410, or some combination thereof.

The locators 1408 are traced by an external imaging device of a virtual reality system, such that the virtual reality system can track the location and orientation of the entire HMD 1400. Information generated by the IMU 1410 and the position sensors 1412 may be compared with the position and orientation obtained by tracking the locators 1408, for improved tracking accuracy of position and orientation of the HMD 1400. Accurate position and orientation is important for presenting appropriate virtual scenery to the user as the latter moves and turns in 3D space.

The HMD 1400 may further include a depth camera assembly (DCA) 1411, which captures data describing depth information of a local area surrounding some or all of the HMD 1400. The depth information may be compared with the information from the IMU 1410, for better accuracy of determination of position and orientation of the HMD 1400 in 3D space.

The HMD 1400 may further include an eye tracking system 1414 for determining orientation and position of user's eyes in real time. The obtained position and orientation of the eyes also allows the HMD 1400 to determine the gaze direction of the user and to adjust the image generated by the display system 1480 accordingly. The determined gaze direction and vergence angle may be used to adjust the display system 1480 to reduce the vergence-accommodation conflict. The direction and vergence may also be used for displays' exit pupil steering as disclosed herein. Furthermore, the determined vergence and gaze angles may be used for interaction with the user, highlighting objects, bringing objects to the foreground, creating additional objects or pointers, etc. An audio system may also be provided including e.g. a set of small speakers built into the front body 1402.

Embodiments of the present disclosure may include, or be implemented in conjunction with, an artificial reality system. An artificial reality system adjusts sensory information about outside world obtained through the senses such as visual information, audio, touch (somatosensation) information, acceleration, balance, etc., in some manner before presentation to a user. By way of non-limiting examples, artificial reality may include virtual reality (VR), augmented reality (AR), mixed reality (MR), hybrid reality, or some combination and/or derivatives thereof. Artificial reality content may include entirely generated content or generated content combined with captured (e.g., real-world) content. The artificial reality content may include video, audio, somatic or haptic feedback, or some combination thereof. Any of this content may be presented in a single channel or in multiple channels, such as in a stereo video that produces a three-dimensional effect to the viewer. Furthermore, in some embodiments, artificial reality may also be associated with applications, products, accessories, services, or some combination thereof, that are used to, for example, create content in artificial reality and/or are otherwise used in (e.g., perform activities in) artificial reality. The artificial reality system that provides the artificial reality content may be implemented on various platforms, including a wearable display such as an HMD connected to a host computer system, a standalone HMD, a near-eye display having a form factor of eyeglasses, a mobile device or computing system, or any other hardware platform capable of providing artificial reality content to one or more viewers.

The present disclosure is not to be limited in scope by the specific embodiments described herein. Indeed, other various embodiments and modifications, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A display device comprising:
   a display panel comprising an array of pixels on a display substrate; and
   a waveguide illuminator coupled to the display panel for illuminating the array of pixels, the waveguide illuminator comprising:
   an illuminator substrate;
   a splitter supported by the illuminator substrate, for splitting an input light beam into a plurality of sub-beams;
   an array of waveguides supported by the illuminator substrate and running parallel to rows of pixels of the array of pixels, wherein each waveguide of the array is configured to guide therein a sub-beam of the plurality of sub-beams; and
   an array of out-coupling gratings coupled to the array of waveguides;

wherein the array of out-coupling gratings extends along the array of pixels for out-coupling portions of the sub-beams to propagate through the display substrate and to form an array of Talbot peaks at a plane of the array of pixels, wherein locations of individual Talbot peaks of the array of Talbot peaks correspond to locations of individual pixels of the array of pixels.

2. The display device of claim 1, further comprising a light source for providing the input light beam to the splitter.

3. The display device of claim 2, wherein the light source is tunable in wavelength;
wherein in operation, the locations of the individual Talbot peaks depend on the wavelength of the light source, wherein the wavelength is selected such that the Talbot peaks are centered on pixels of the array of pixels.

4. The display device of claim 2, wherein the light source has an emission bandwidth;
wherein in operation, widths of the Talbot peaks of the array of Talbot peaks depend on the emission bandwidth of the light source, wherein the widths of the Talbot peaks are larger than widths of pixels of the array of pixels, for overfilling apertures of the pixels to facilitate alignment of the waveguide illuminator to the display panel.

5. The display device of claim 2, wherein the light source is a multi-color light source for providing the input light beam comprising light of a plurality of color channels.

6. The display device of claim 5, wherein the splitter is configured to couple multiple color channels of the plurality of color channels into individual waveguides of the array of waveguides, wherein each waveguide of the array of waveguides is configured to guide therein the light of each one of the plurality of color channels.

7. The display device of claim 6, wherein the waveguide illuminator further comprises a color-selective reflector in an optical path between the array of out-coupling gratings and the substrate of the display panel, wherein the color-selective reflector is configured to provide different optical path lengths for the light of different color channels of the plurality of color channels.

8. The display device of claim 7, wherein the color-selective reflector comprises a stack of dichroic reflectors configured to reflect the portions of the sub-beams out-coupled by the array of out-coupling gratings to propagate back through the illuminator substrate to impinge onto the pixels of the array of pixels.

9. The display device of claim 5, wherein the splitter is configured to couple different color channels of the plurality of color channels into different waveguides of the array of waveguides, wherein the different waveguides are disposed at different depths within the illuminator substrate.

10. The display device of claim 1, wherein the array of waveguides comprises ridge waveguides, and wherein the gratings of the array of out-coupling gratings are formed in the ridge waveguides of the array of waveguides.

11. A method for coupling a display panel comprising an array of pixels to a waveguide illuminator comprising an array of out-coupling gratings coupled to an array of waveguides in which a plurality of sub-beams of an input light beam propagate in the waveguides parallel to rows of the array of pixels, the method comprising:
using the array of out-coupling gratings to out-couple portions of the sub-beams propagating in the array of waveguides, to propagate through a substrate of the display panel towards the array of pixels;
forming an array of Talbot peaks at a plane of the array of pixels; and
tuning a center wavelength of the light beam to center locations of individual Talbot peaks of the array of Talbot peaks on pixels of the array of pixels.

12. The method of claim 11, further comprising using a light source to provide the input light beam.

13. The method of claim 12, further comprising using a splitter coupled to the array of waveguides to split the input light beam provided by the light source.

14. The method of claim 11, further comprising using a multi-color light source to the input light beam comprising light of a plurality of color channels.

15. The method of claim 14, further comprising:
using a splitter to couple multiple color channels of the plurality of color channels into individual waveguides of the array of waveguides; and
guiding the light of each one of the plurality of color channels in each waveguide of the array of waveguides.

16. The method of claim 15, further comprising using a color-selective reflector in an optical path between the array of out-coupling gratings and the display panel to provide different optical path lengths for the light of different color channels of the plurality of color channels.

17. The method of claim 14, further comprising:
using a splitter to couple different color channels of the plurality of color channels into different waveguides of the array of waveguides, wherein the different waveguides are disposed at different depths within a substrate of the illuminator.

18. A method for coupling a display panel comprising an array of pixels to a waveguide illuminator comprising an array of out-coupling gratings coupled to an array of waveguides, the method comprising:
using a light source to provide an input light beam having an emission bandwidth;
using a splitter to split the input light beam into a plurality of sub-beams;
propagating the plurality of sub-beams in the waveguides parallel to rows of the array of pixels;
using the array of out-coupling gratings to out-couple portions of the sub-beams propagating in the array of waveguides, to propagate through a substrate of the display panel towards the array of pixels; and
forming an array of Talbot peaks at a plane of the array of pixels;
wherein widths of the Talbot peaks of the array of Talbot peaks depend on the emission bandwidth of the light source, and the widths of the Talbot peaks are larger than widths of pixels of the array of pixels, for overfilling apertures of the pixels to facilitate alignment of the waveguide illuminator to the display panel.

19. The method of claim 18, wherein:
the light source is a multi-color light source providing the input light beam comprising light of a plurality of color channels;
the splitter couples multiple color channels of the plurality of color channels into individual waveguides of the array of waveguides; and
the method further comprises using a color-selective reflector in an optical path between the array of out-coupling gratings and the display panel to provide different optical path lengths for the light of different color channels of the plurality of color channels.

20. The method of claim 18, wherein:
the light source is a multi-color light source providing the input light beam comprising light of a plurality of color channels;
the splitter couples different color channels of the plurality of color channels into different waveguides of the array of waveguides; and
the different waveguides are disposed at different depths within a substrate of the illuminator.

* * * * *